United States Patent
Kaplan

[15] 3,670,902
[45] June 20, 1972

[54] BAR UNSCRAMBLER
[72] Inventor: Irving Leonard Kaplan, Cleveland Heights, Ohio
[73] Assignee: Carl Krasny & Associates, Inc., Cleveland, Ohio
[22] Filed: Nov. 19, 1969
[21] Appl. No.: 878,132

[52] U.S. Cl..............................................214/1 P, 198/219
[51] Int. Cl.......................................................B23q 5/22
[58] Field of Search...........................214/1 P, 1 PB; 198/219

[56] References Cited

UNITED STATES PATENTS

| | | | |
|---|---|---|---|
| 1,082,387 | 12/1913 | Ahlen et al............................ | 214/1 PB |
| 3,108,699 | 10/1963 | Anschutz............................... | 214/1 P |
| 3,420,357 | 1/1969 | Eck........................................ | 198/219 |

Primary Examiner—Gerald M. Forlenza
Assistant Examiner—Jerold M. Forsberg
Attorney—Isler and Ornstein

[57] ABSTRACT

A bar unscrambler is provided consisting of feed cradles, shuffle bed modules, and bar feeder units, which are so arranged as to effectively and progressively unscramble or separate bars and the like from a bundle of bars and from each other. The feed cradles are provided with elements having a walking beam type of movement. The shuffle bed modules comprise mainly walking and fixed beam components, the walking beam components functioning also to activate the aforesaid feed cradle elements. The bar feeders have incorporated therein bar stops effective to temporarily restrain movement of the unscrambled bars, and have also incorporated therein bar selectors designed to individually move the restrained bars to a transfer mechanism or the like, the movements of the bar selectors being synchronized to avoid interference with the bars as they move to the bar stops. Provision is also made for adjusting the position of the bar stops to accommodate bars of different sizes or dimensions.

6 Claims, 18 Drawing Figures

INVENTOR.
IRVING LEONARD KAPLAN

INVENTOR.
IRVING LEONARD KAPLAN
BY
*Isler & Ornstein*
ATTORNEYS

INVENTOR.
IRVING LEONARD KAPLAN
BY
*Isler & Ornstein*
ATTORNEYS

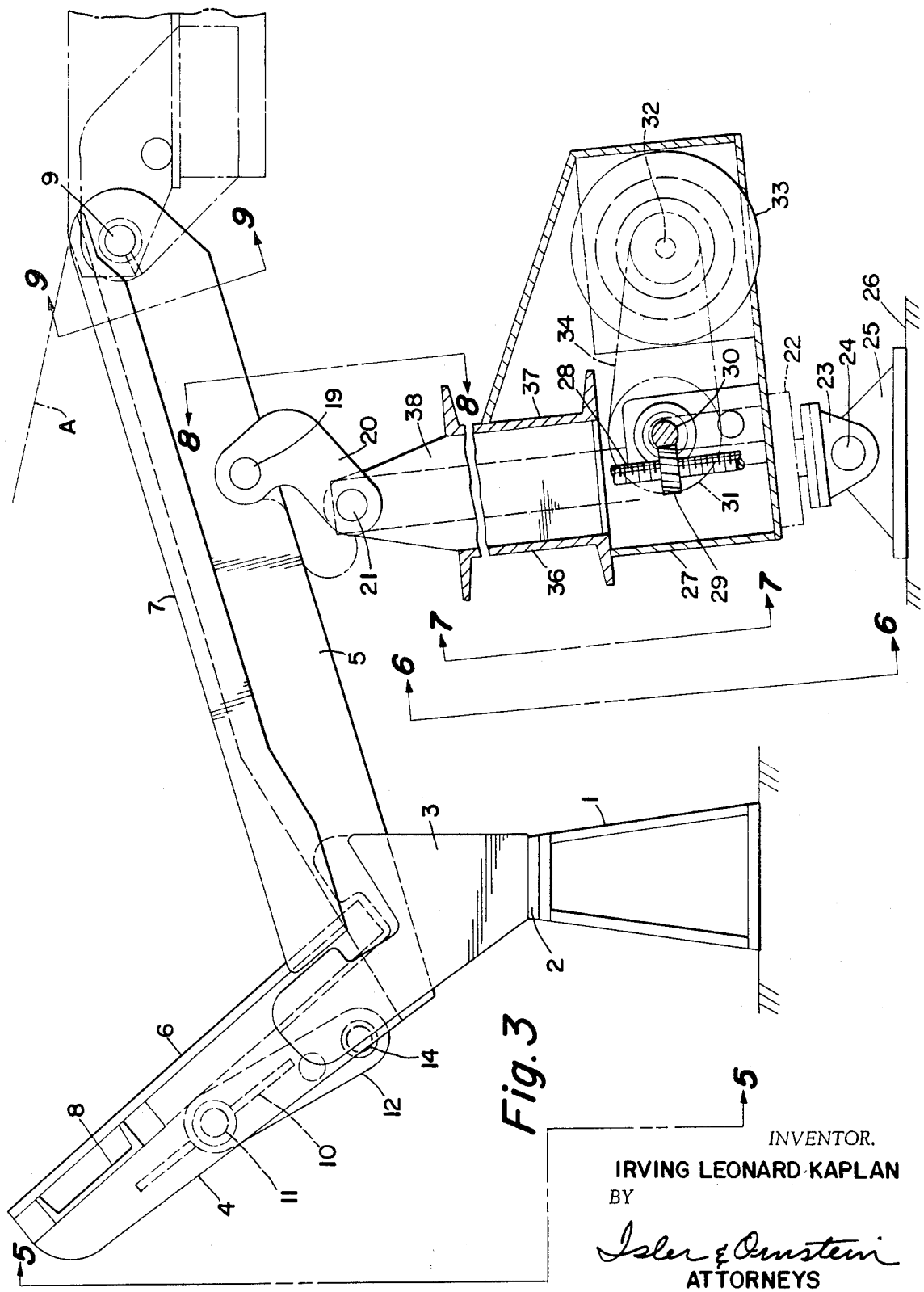

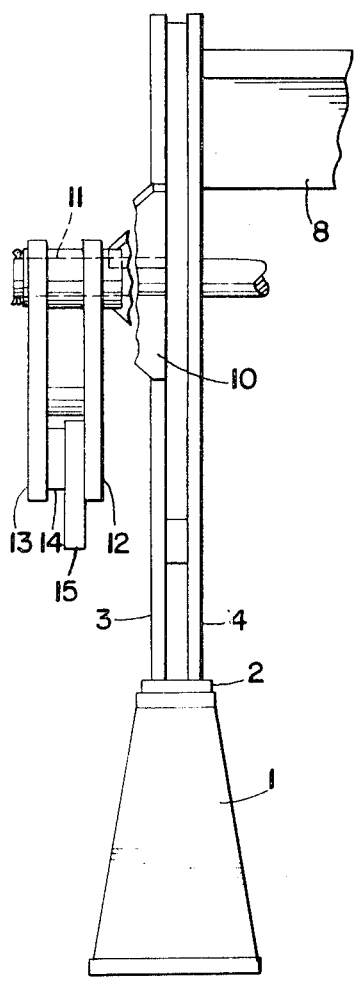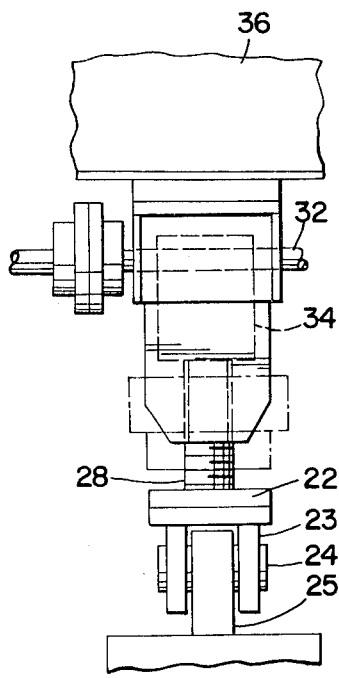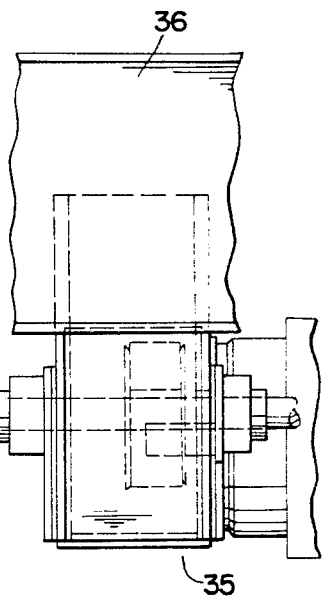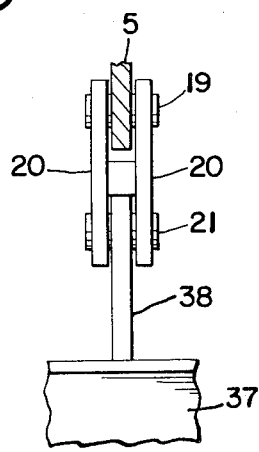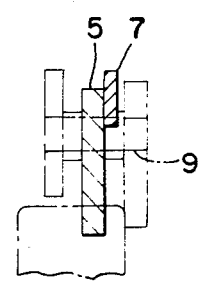
Fig. 5
Fig. 6
Fig. 7
Fig. 8
Fig. 9
INVENTOR.
IRVING LEONARD KAPLAN
BY
Isler & Ornstein
ATTORNEYS

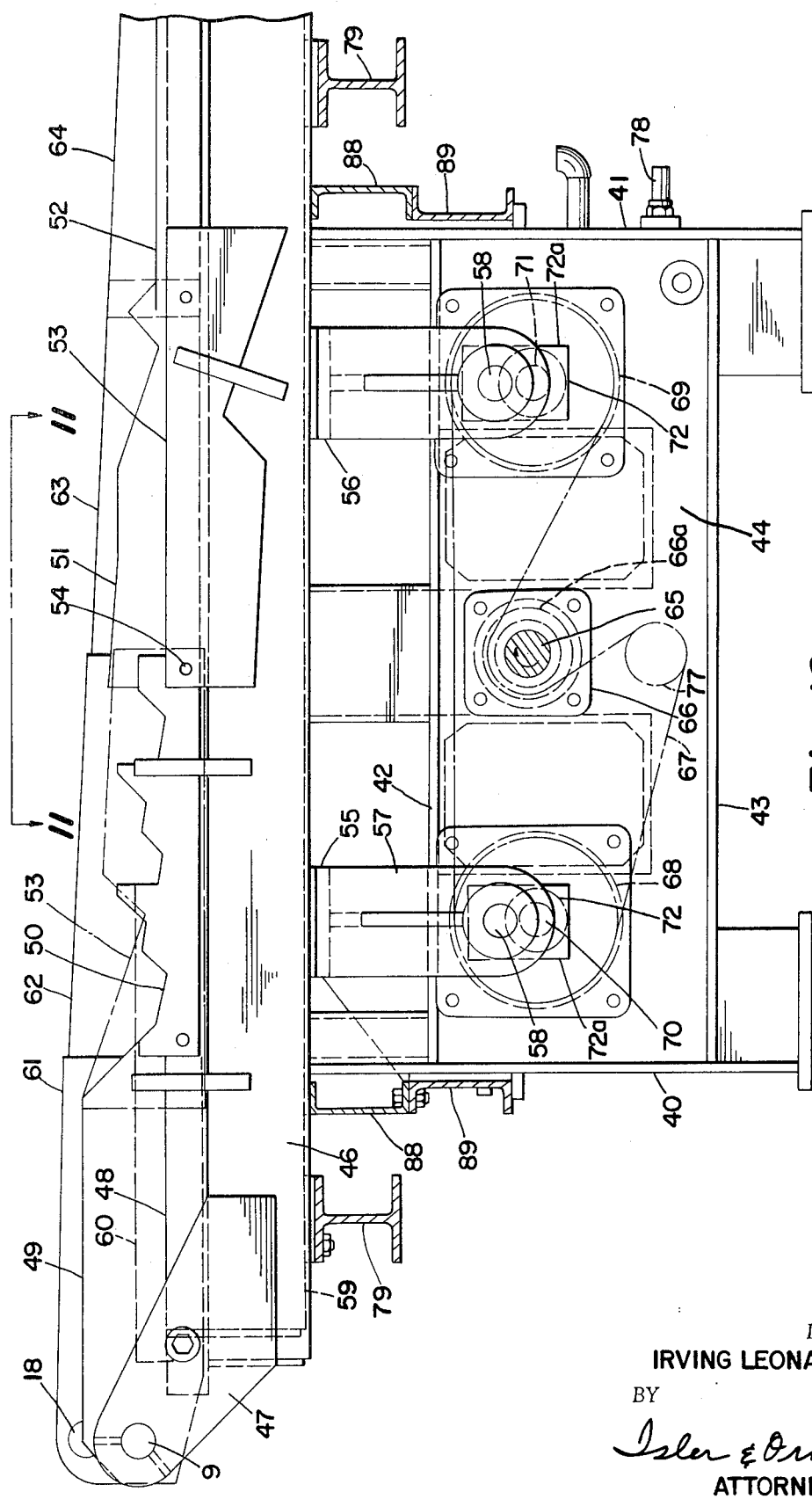

INVENTOR.
IRVING LEONARD KAPLAN
BY

*Isler & Ornstein*

ATTORNEYS

BAR UNSCRAMBLER

Bar and rod feeders, commonly termed "bar unscramblers," are disclosed in various patents, including U.S. Pat. Nos. 2,856,080; 2,999,603; 3,130,830; 3,139,170; 3,157,292; 3,160,287; 3,182,816; 3,208,577; 3,214,001; 3,266,615 and 3,308,968.

Many of these unscramblers are of such design and construction as to be ineffective to unscramble bars and rods of all shapes and sizes, while some are of such construction and design as to be ineffective to move and unscramble bars in an efficient and expeditious manner.

The present invention has, as its primary object, the provision of a bar unscrambler which is of simple, uncomplicated construction, yet is effective to move and unscramble bars or rods of different sizes and shapes in a highly efficient and expeditious manner.

Another object of the invention is to provide an unscrambler consisting of feed cradles, shuffle bed modules, and bar feeder units which are so arranged as to effectively unscramble or separate bars from a bundle of bars and from each other, in a progressive and orderly manner.

Another object of the invention is to provide an unscrambler utilizing feed cradles of novel construction and having a unique movement which avoids shock or damage to the parts, and which also has incorporated therein components having a walking-beam type of movement.

A further object of the invention is to provide an unscrambler utilizing novel shuffle bed modules having walking and fixed beam components, and in which the walking beam components are also used to activate the walking beam components of the feed cradles.

A further object of the invention is to provide an unscrambler in which bar feeders or bar feeder units of novel construction are employed, and which have incorporated therein or associated therewith bar stops which are effective to temporarily restrain movement of the unscrambled bars, as well as bar selectors which are effective to move the restrained bars to a transfer mechanism or the like.

A further object of the invention is to provide bar feeders or bar feeder units, in which the movements of the bar selectors are synchronized to avoid interference with the bars as they move to the bar stops.

A still further object of the invention is to provide readily accessible means for adjusting the position of the bar stops to accommodate bars of different sizes or dimensions.

Other objects and advantages of my invention will be apparent during the course of the following description.

In the accompanying drawings, forming a part of this specification, and in which like numerals are employed to designate like parts throughout the same, FIG. 1 is a fragmentary plan view, illustrating, in somewhat diagrammatic manner, an unscrambler embodying the invention;

FIG. 3 is a fragmentary side elevational view, on an enlarged scale, of one of the feed cradle units, as viewed in the direction indicated by the line 3—3 of FIG. 2;

FIG. 5 is a fragmentary rear elevational view of the cradle unit, as viewed in the direction indicated by the arrows 5—5 of FIG. 3;

FIG. 6 is a fragmentary rear elevational view, taken on the line 6—6 of FIG. 3, and showing the mechanism for raising and lowering the feed cradle units;

FIG. 7 is a fragmentary rear elevational view, taken on the line 7—7 of FIG. 3, and showing the drive unit for the mechanism shown in FIG. 6;

FIG. 8 is a fragmentary cross-sectional view, taken on the line 8—8 of FIG. 3;

FIG. 9 is a fragmentary cross-sectional view, taken on the line 9—9 of FIG. 3;

FIG. 10 is a side elevational view of one of the powered shuffle bed modules, taken on the line 10—10 of FIG. 1;

GENERAL ARRANGEMENT

Figure 1:
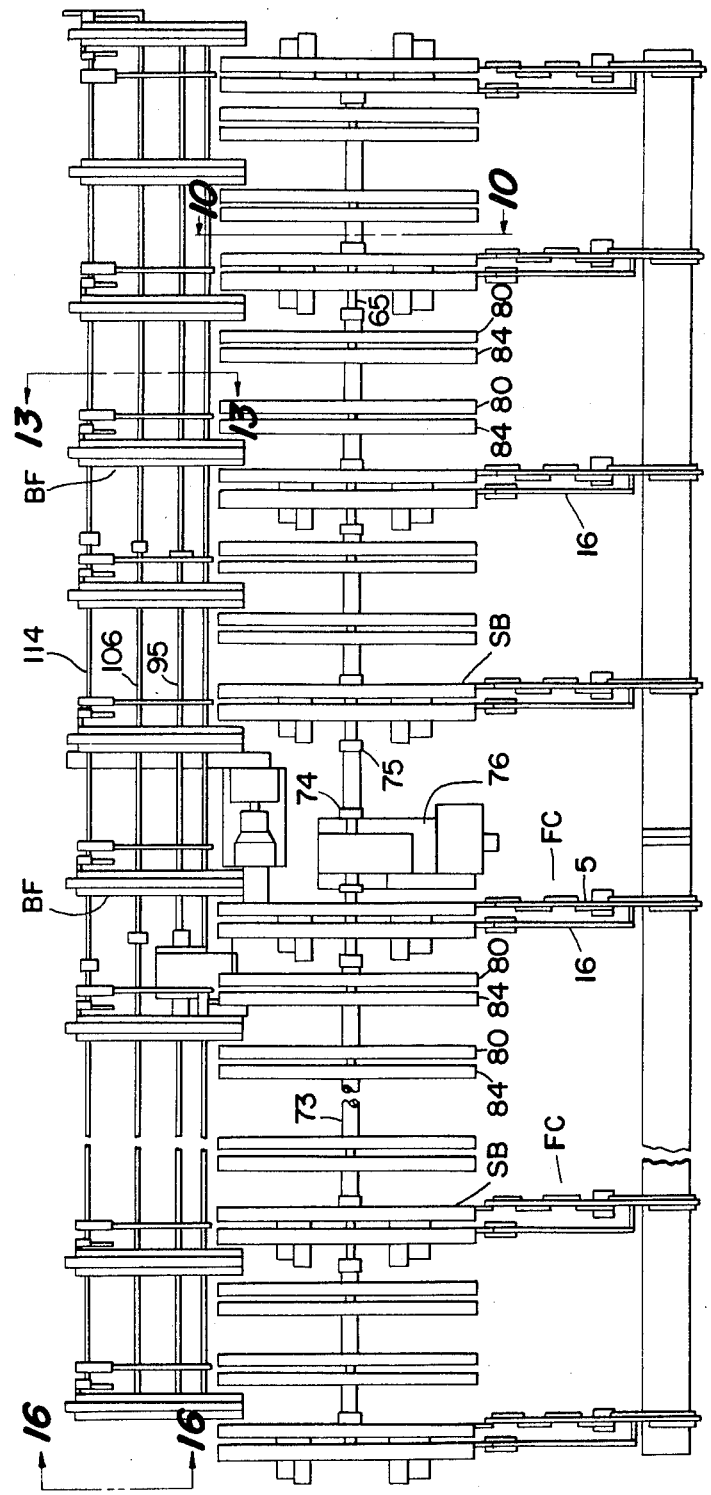
Figure 2:
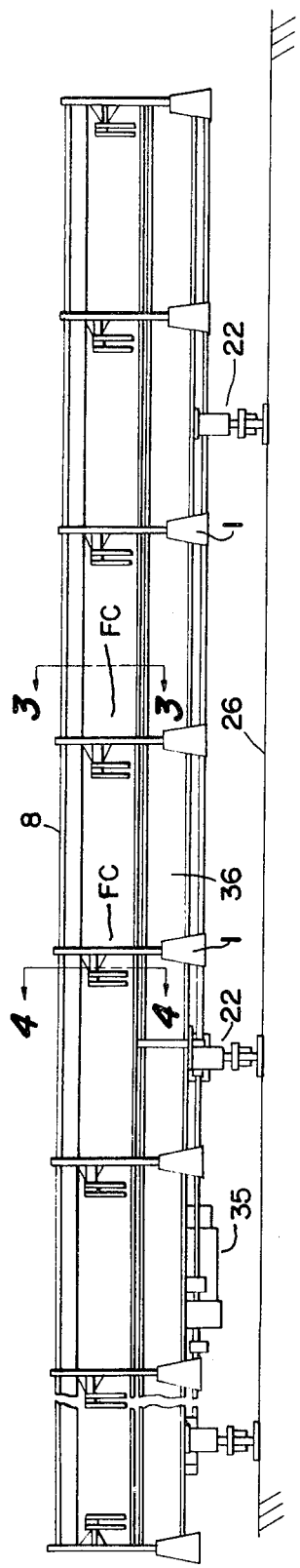
FIG. 2 is a fragmentary rear elevational view of the unscrambler, as viewed from the bottom of FIG. 1, looking in the direction of bar flow and toward the pass line of the unscrambled bars, and showing more particularly the arrangement of feed cradles and driving means therefor.

Referring more particularly to FIGS. 1 and 2 of the drawings, a series of laterally-spaced feed cradles are shown, in somewhat diagrammatic manner, each being generally designated by reference character FC. Each of these feed cradles is of substantially identical construction or assembly.

It may be noted that some of the feed cradles and other components of the unscrambler have been omitted in FIGS. 1 and 2, due to the necessity of avoiding reduction of the scale of these figures to a size in which clarity is sacrificed.

Disposed forwardly of or in tandem with each of the feed cradles FC is a shuffle bed module, generally designated by reference character SB, and also shown in somewhat diagrammatic manner.

Disposed forwardly of the shuffle beds, but in slightly laterally-offset relation to the shuffle beds, are bar feeders or bar feeder units generally designated by reference character BF. These are also shown in somewhat diagrammatic manner.

Other elements or units which form parts of the unscrambler will be described in connection with the following detailed description of the aforesaid units of the unscrambler.

FEED CRADLE

The specific construction of each of the feed cradles FC is shown most clearly in FIGS. 1 to 9, inclusive.

Each of the feed cradles is mounted for movement between a low position shown in solid lines in FIG. 3, and a high position indicated approximately by the broken line A in said figure. In its low position, the feed cradle rests on a floor-mounted rigid pedestal 1.

Each feed cradle unit comprises an assembly consisting of a base element 2, having an upstanding member 3, to which is welded a cradle arm which consists of a portion 4 which is inclined rearwardly in the low position of the cradle and a portion 5 which extends forwardly at an angle of about 120° to the portion 4. The portion 4 of the cradle arm has fastened thereto a wear plate 6, and the portion 5 of the cradle arm has fastened thereto a wear plate 7. These wear plates coact to provide a support for the bundles of bars which are to be unscrambled.

The portions 4 of the cradle arms are interconnected with each other by means of channel beams 8, so that all of the cradle units are movable in unison with each other.

The portions 5 of the cradle arms are pivotally connected at their forward ends to pins 9 (FIG. 3) which are carried by the fixed or stationary beams of the shuffle bed modules SB to be presently described.

Each of the portions 5 of the cradle arms carries a bracket 10, on which is mounted a shaft 11, to which is pivotally connected a unit consisting of interconnected links 12 and 13, in the lower ends of which is mounted a pin 14. The pin 14 has pivotally connected thereto the rear end of a walking feed cradle 15 (FIG. 4) to which is fastened wear plates 16 and 17. The wear plate 17 is pivotally connected at its forward ends to a pin 18 (see FIG. 10) which is carried by the walking beam of the shuffle bed module SB to be presently described.

Pivotally connected to the portions 5 of the cradle arms, as by pins 19, are bell crank levers 20, the lower arms of which carry a pin 21.

For the purpose of elevating the cradle units from a low position shown in solid lines in FIG. 3, to the high position shown in broken lines at A, a plurality of jacks is provided, each of which is generally designated by reference numeral 22.

These jacks may be of the type known as the Duff-Norton Ball Screw Jactuator, and each jack is mounted on a clevis 23, which is pivotally mounted on a pin 24 carried by a bracket 25 which is rigidly secured to the floor 26.

Each jack comprises a housing 27 within which is mounted a screw 28, which carries a worm gear 29. The worm gear 29 is driven by a worm 30. Interconnecting shafts, concentric with worm 30 couple the several jacks which operate in this assembly. One of these interconnecting shafts, concentric with worm 30, is driven by pulley 31, pulley 33, endless belt 34, and the electric motor drive shaft 32. Drive shaft 32 is the output of an electrical motor or other type of prime mover generally designated by reference character 35 (see FIGS. 2 and 7).

The screws 28 of the jacks transmit movement to the feed cradles through an assembly consisting of spaced channel members 36 and 37 and a beam 38 welded therebetween.

The beam 38 is pivotally connected to the pins 21 on the bell crank levers 20, so that actuation of the screws 28 causes movement of the feed cradles.

The beam 38 has an overtravel of about two inches, represented by the solid and broken line positions of the bell crank levers 20 in FIG. 3, so as to eliminate shock forces on the jacks when the feed cradles are in their low position.

The operation of the feed cradles will be described later in this specification, in connection with the general operation of the unscrambler.

POWERED SHUFFLE BED MODULES

The construction of a typical powered shuffle bed module, such as module SB, is illustrated most clearly in FIGS. 1, 10, 11 and 12.

The shuffle bed module SB comprises a housing consisting of end plates 40 and 41, which are interconnected by horizontal members 42 and 43 and side members 44 and 45 which form an enclosure for drive mechanism to be presently described.

Mounted on the end plates 40 and 41 is a tubular member or beam 46, to one end of which is secured a bracket 47 in which is mounted the pin 9 to which the portion 5 of the feed cradle arm is pivotally secured, as previously stated.

Mounted on the tubular member 46 is a longitudinally extending plate 48 to the sides of which are secured wear plates 49, 50, 51 and 52, which constitute sections of a fixed or stationary beam, the upper edges of some of which are provided with notches or recesses adapted to receive bars or rods which are being unscrambled, as these bars or rods are progressively moved by a walking beam to be presently described.

The arrangement of wear plates, as thus described, is designed primarily for the unscrambling of shapes and flats, that is to say, the arrangement of notches or recesses in the wear plate 50 is designed more particularly for that purpose.

For the unscrambling of rounds, an auxiliary wear plate 53 is provided, which is pivotally secured to the plate 48, as at 54, and when not in use, is stored in the position shown in solid lines in FIG. 10, out of the path of movement of the bars. When it is desired to use the plate 53, it is swung about the pivot 54 to the position shown in broken lines in FIG. 10, in which position it eliminates the wear plate 50 from functioning, and itself functions to facilitate the unscrambling of rounds.

The shuffle bed module further includes a pair of longitudinally spaced supports 55 and 56, which extend transversely of the module below the tubular member 46. These supports have welded thereto at their ends depending brackets 57 providing bearing for crankpins 58.

Mounted on the supports 55 and 56, in adjacent parallel relation to the tubular member 46, is a second tubular member 59, on which is mounted a longitudinally extending plate 60, to the sides of which are secured wear plates 61, 62, 63 and 64, constituting sections of a walking beam designed to coact with the stationary or fixed beam to progressively move the bars, rods, flats or shapes, to be unscrambled, along the latter.

The wear plate 61 is provided at its rear end with a pin 18, to which the wear plate 17 of the walking feed cradle is pivotally connected, so that the walking beam movement of the plate 61 is thus imparted to the walking feed cradle.

Means are provided for imparting to the walking beam an orbital movement. Such means comprises a drive shaft 65 which is mounted to rotate in bearings 66 affixed to the side members 44 and 45 of the shuffle bed module. The shaft 65, through a sprocket 66a mounted centrally thereof drives an endless sprocket or roller chain 67, which, in turn, drives sprockets 68 and 69 which are mounted on crankshafts 70 and 71, mounted to rotate in bearings 72 affixed to the side members 44 and 45.

The crankshafts 70 and 71 are provided at their ends with crank arms 72a from which the crankpins 58 extend, these crankpins, as previously stated, being mounted in the brackets 57.

The shafts 65 of the shuffle bed modules are driven by means of shafts 73 which interconnect the shafts 65 through couplings 74 and 75 (see FIG. 1).

The drive shafts of the shuffle beds are driven in unison by means of a shuffle bed drive assembly, which is shown in FIG. 1, and is generally designated by reference numeral 76.

In FIG. 10, the sprocket chain 67 is shown as trailed around on idler sprocket 77. A mechanism (not shown), but actuatable by a screw 78 (FIG. 10) may be employed for the purpose of shifting the position of the sprocket 77 to thereby take up any slack or looseness in the chain 67.

It will be apparent from the foregoing description that rotation of the shafts 65 in a clockwise direction, as indicated by the arrow in FIG. 10, will cause an orbital movement of the crankpins 58 in a counterclockwise direction, and thus cause the walking beam to have a similar orbital movement between a low position and a high position.

It has been found that if the center line of the crankshaft 71 is slightly higher than the center line of the crankshaft 70, that although the orbital movements of the crankpins of the respective shafts is the same, there is a longer component of linear travel of the walking beam at the right end of the beam, as viewed in FIG. 10, than at the left end of the beam, which difference in linear travel causes a quicker and more effective unscrambling action of the bars.

The roller chain 67, as previously stated, passes over an idler sprocket 77, which exerts a tension on the chain to maintain it in a relatively taut condition. Any looseness in the chain may be taken up by adjustment of the position of the idler sprocket 77. The mechanism for this adjustment is not shown, but a screw which is rotatable by a tool, for this purpose, is indicated by reference numeral 78.

When the span between the powered shuffle bed modules is such that the portions of the bars between such modules are not properly supported, and might sag, it is desirable to utilize non-powered shuffle bed modules which are disposed between the powered modules.

Such non-powered modules are, in effect, units similar to those described, as to their fixed and walking beam components, but without the housing structure embodied in the powered modules.

Figure 12:
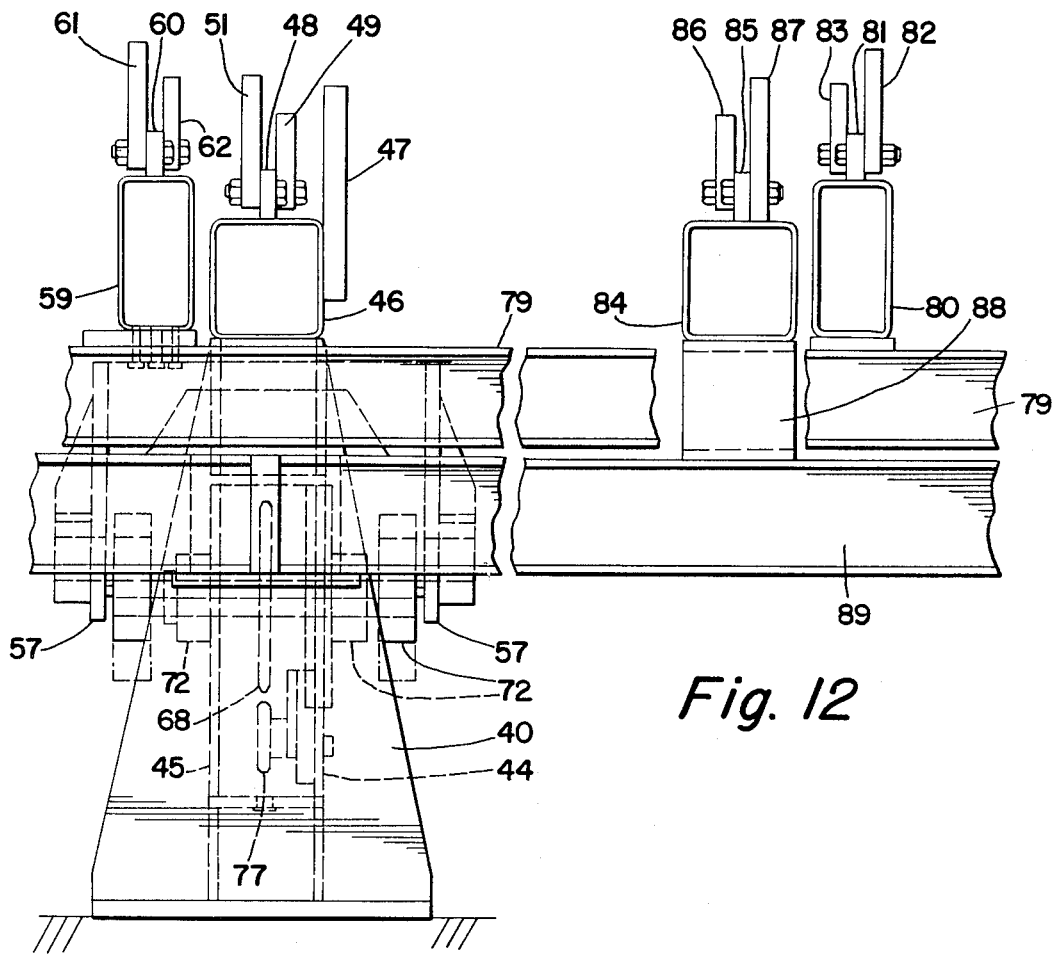
FIG. 12 is a fragmentary rear elevational view of the shuffle bed module of FIG. 10, as viewed from the left end of FIG. 10, but showing also a set of intermediate stationary and walking beams.
Figure 11:
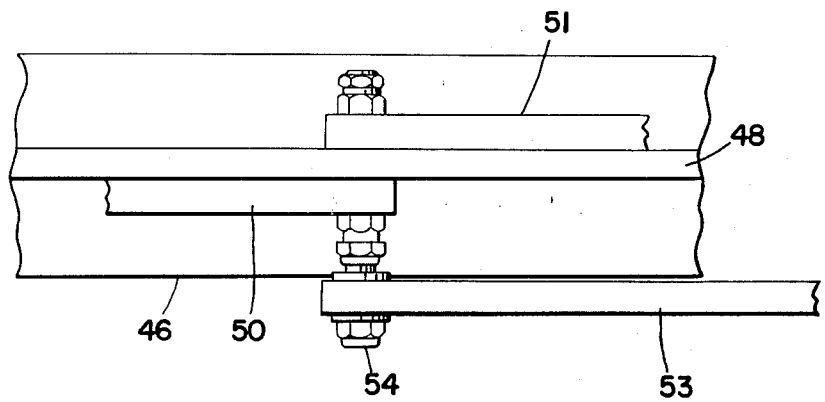
FIG. 11 is a fragmentary top plan view of a portion of the shuffle bed module, as viewed in the direction indicated by the arrows 11—11 in FIG. 10.

For this purpose, as best shown in FIGS. 1, 10 and 12, beams 79 are secured to and interconnect the ends of the tubular members 59, and serve to support tubular members 80, which are similar in all respects, to the members 59. The members 80 have mounted thereon longitudinally extending plates 81, to the sides of which are secured wear plates similar to the wear plates 61, 62, 63 and 64, which constitute sections of a walking beam which act in unison with the wear plates 61, 62, 63 and 64, to progressively move the bars, rods, flats or shapes to be unscrambled. FIG. 12 shows two of these wear plates, designated 82 and 83, respectively.

The beams, constituted of the members 80, plate 81, and wear plates mounted on the latter, are designed to coact with stationary or fixed beams, consisting of tubular members 84, similar to the members 46, plates 85, and wear plates similar to the wear plates 49, 50, 51 and 52, two of such wear plates, 86 and 87 being seen in FIG. 12. The tubular members 84 are supported on channel beams 88, which, in turn, are supported on channel beams 89, which are attached to and interconnect the end plates 40 and 41 of the powered shuffle bed modules.

BAR FEEDER, BAR STOP AND BAR SELECTOR

The bar feeders BF are best seen in FIGS. 13, 13A, 14, 15, 16 and 17, and comprise an assembly or unit consisting of a transfer chain, bar stop and bar selector, each of which will be separately described.

The assembly or unit includes a housing which supports a pair of transversely spaced channel members 90 and 91, in the ends of which are mounted sprockets 92 and 93, about which are trained an endless chain 94, which is designed to carry bars deposited thereon from the shuffle bed modules to the bar stop.

The chain 94 is driven by means of a drive shaft 95, which is journalled for rotation in the housing and which extends the entire width of the unscrambler, so that it simultaneously drives the chains 94 of all of the bar feeders.

The drive shaft 95 drives the chain 94 through a sprocket 96, the chain passing over spaced idler sprockets 97 and 98, mounted in the housing.

The bar stop is designated by reference numeral 99 and is disposed in laterally spaced relation to the channel member 90. It is attached at its lower portion to the upper end of a lever 100, which is pivotally connected to a pivot pin 101 mounted on the bar feeder housing. The bar stop is adjustable between a first position, shown in broken lines in FIGS. 13 and 13A, and a second position, shown in solid lines in FIGS. 13 and 13A, to provide varying stop positions for bars of different sizes, cross-sections and conditions.

This adjustable movement of the bar stop is effected by means of an adjustable rod 102, which is pivotally connected at its forward end to a pivot pin 103 on the lever 100, and is pivotally connected at its rear end to a crankpin 104 carried by a crank member 105 driven by a drive shaft 106. The drive shaft 106 extends the entire width of the machine, and simultaneously adjusts all of the bar stops. This adjustable movement is effected by the orbital movement of the crank pin 104 about the axis of the drive shaft 106.

For the purpose of separating each of the bars B from the bars on the chain 94 which are immediately behind the bar B, a bar selector mechanism is provided.

The bar selector mechanism includes a bar selector 107, which when the bar stop is in position to restrain the bar B against forward movement, extends vertically, and is provided in its upper end with a forwardly and downwardly inclined surface 108 and an upwardly inclined surface 109 extending forwardly from the forward end of the surface 108, the surfaces 108 and 109 coacting to provide a notch or recess in which the bar B rests pending transfer of this bar to a conveyor or the like.

The bar selector 107 is secured, as by bolts 110 and nuts 111, to a bracket 112, which is welded at its lower end to a collar 113. The collar 113 is rotatably mounted with respect to an assembly or unit, which is keyed to a shaft 114, which is mounted for rotation in the bar.

The collar 113 has welded thereto, at a point spaced circumferentially from the bracket 112, a bracket 115, which is secured, as by bolts 116 and nuts 116a, to bracket extensions 117, which, in turn, are pivotally secured to the forward end of an adjustable connector rod 118. The connector rod 118 is pivoted at its rear end to a pivot pin 119 which is mounted in a bracket 120 secured to the bar feeder housing.

Figure 13A:
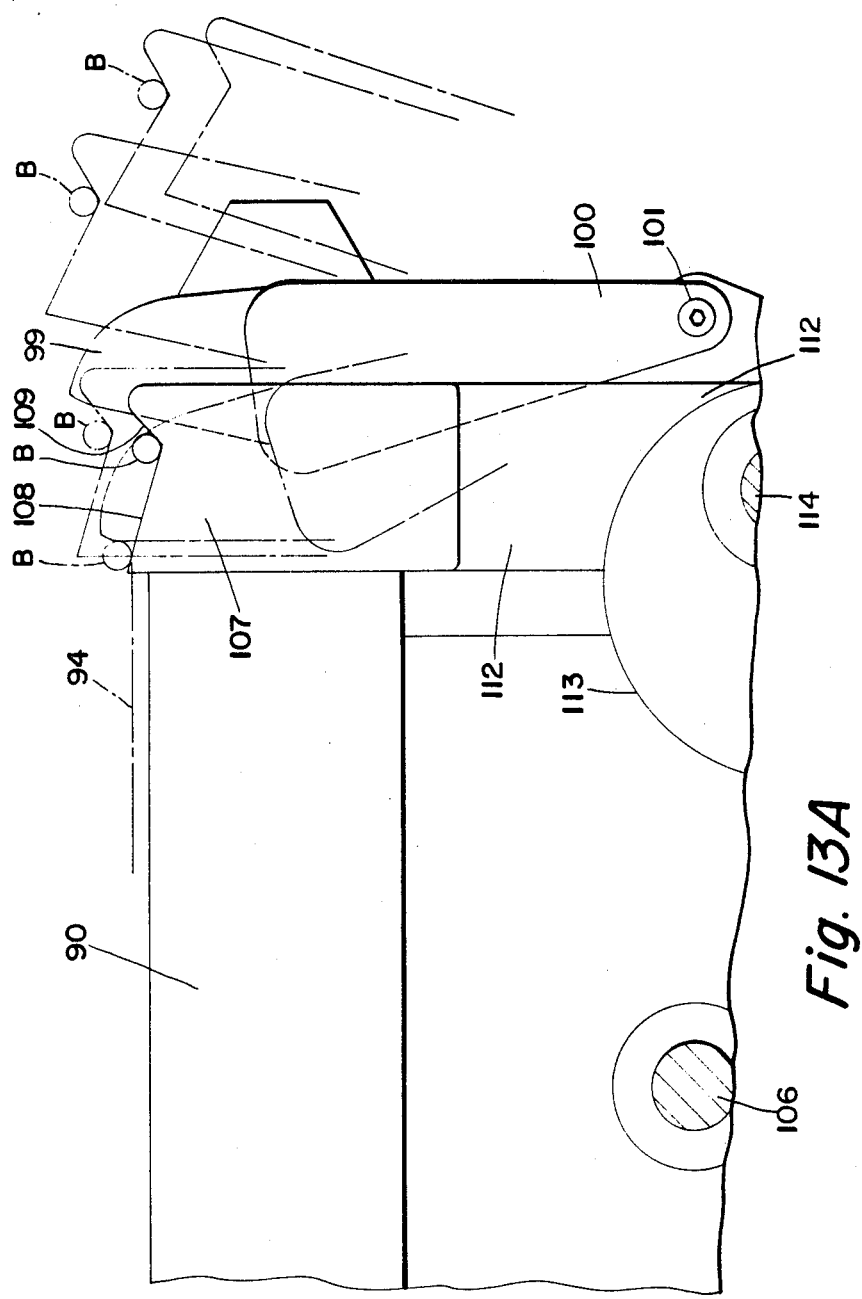
FIG. 13A is a fragmentary view, on an enlarged scale, of a portion of FIG. 13, showing, in broken outline, various movements of the bar stop and bar selector.

The collar 113 is in eccentric relation to the axis of the drive shaft 114, so that rotation of the drive shaft causes the assembly or unit on which the collar 113 is mounted to rotate, which, in turn, causes the collar 113 and the bar selector 107 to oscillate during each rotation of the shaft 114 through the various positions shown in broken lines in FIG. 13A.

BAR SIZE ADJUSTMENT

For the purpose of adjusting the position of the bar stop 99 in accordance with the size of the bars to be stopped, means have been provided for adjusting the initial position of the shaft 106.

Figure 16:
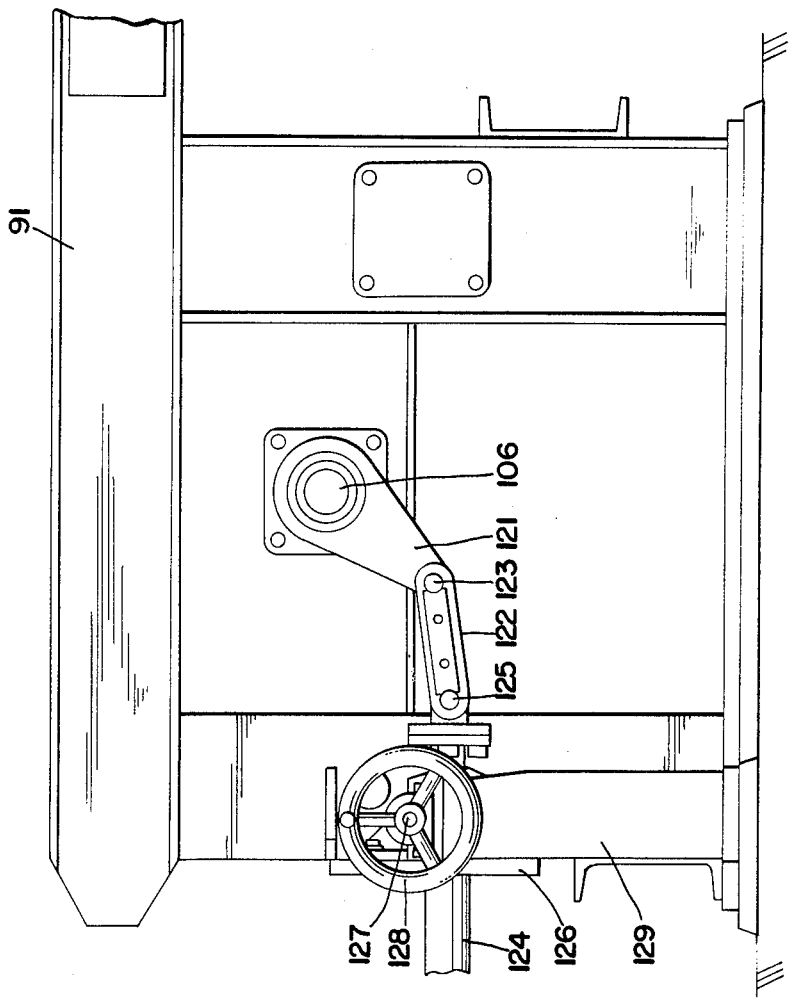
FIG. 16 is a side elevational view of the bar feeder, bar stop and bar selector unit at the extreme left in FIG. 1, by the indicated by arrows 16—16, and showing means for adjusting the position of the bar stop.
Figure 17:
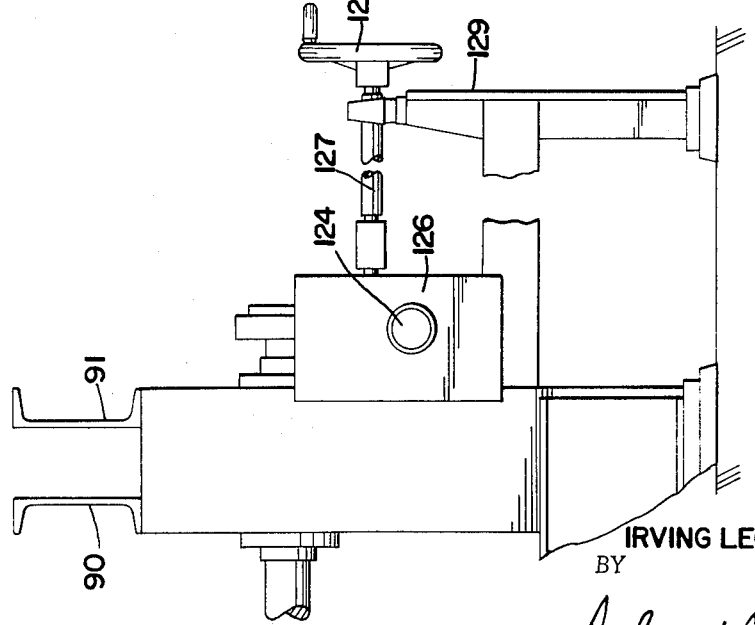
FIG. 17 is a fragmentary elevational view of the unit of FIG. 16, as viewed from the left end of FIG. 16.
Figure 14:
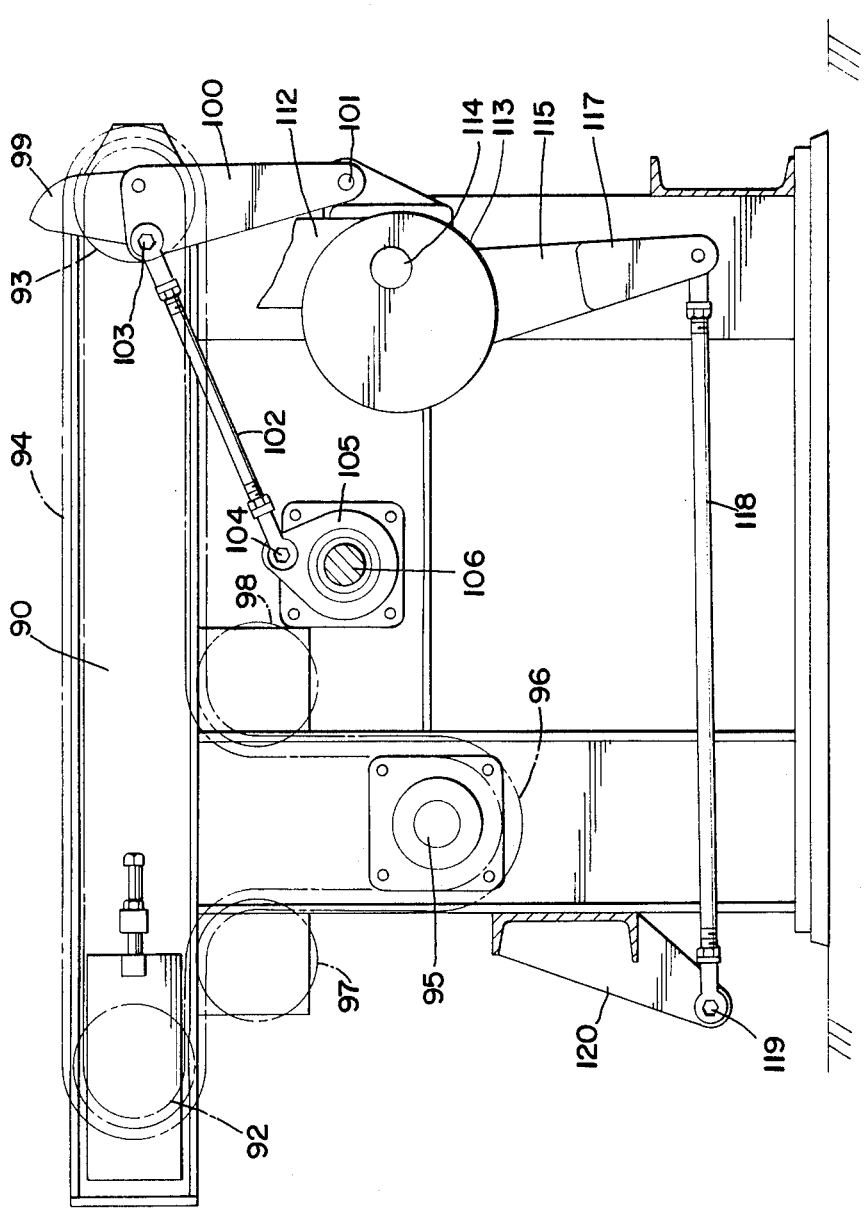
FIG. 14 is a view similar to FIG. 13, but showing certain other details of construction.
Figure 15:
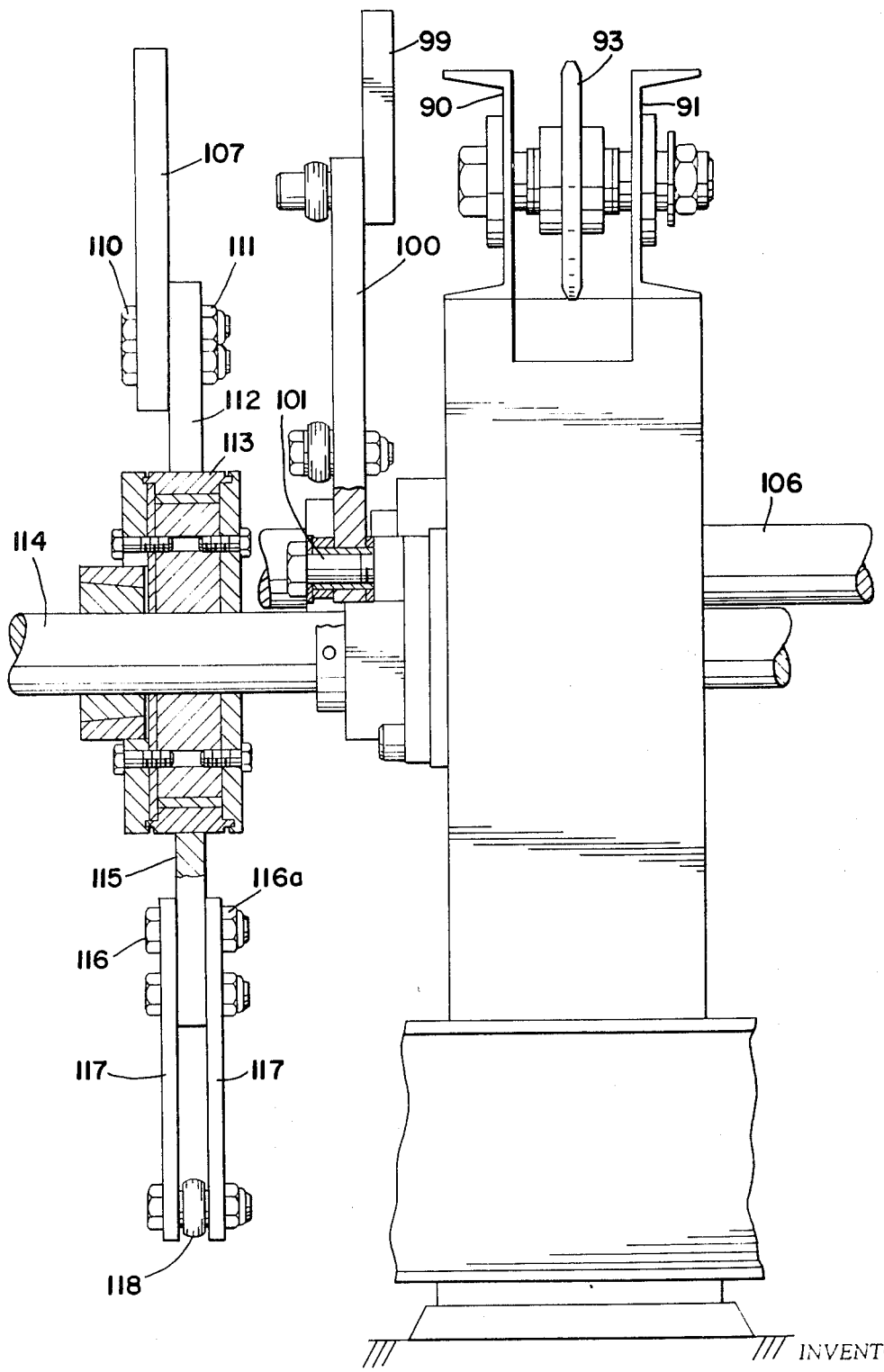
FIG. 15 is a fragmentary elevational view of the bar feeder, bar stop, and bar selector, as viewed from the right end of FIG. 13, with portions shown in cross-section.
Figure 13:
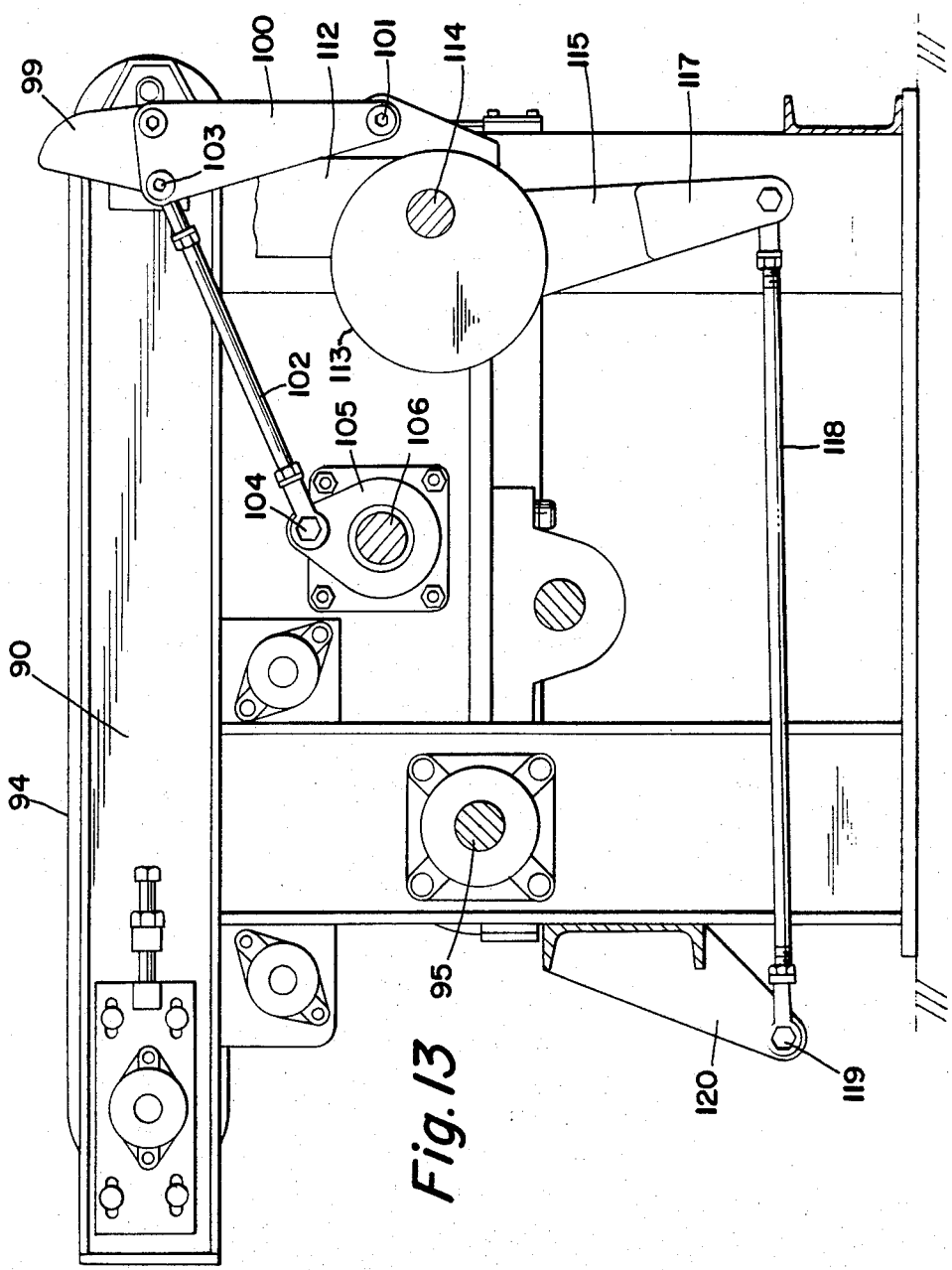
FIG. 13 is a view, partly in side elevation and partly in section, taken on the line 13—13 of FIG. 1, of one of the bar feeder, bar stop, and bar selector units.

Such adjustment means is best seen in FIGS. 16 and 17, and is provided in association with the bar feeder shown at the extreme left in FIG. 1.

Such means comprises a lever 121, which is keyed to the shaft 106, a link 122 pivoted, as at 123, to the lever 121, and a translating screw 124, which is pivoted, as at 125, to the link 122.

The translating screw 124 is mounted for slidable reciprocal movement in a housing 126.

The position of the translating screw 124, for the purpose of adjusting the position of the lever 121, is adjusted by means of a worm shaft 127, which is actuated by a hand wheel 128, the shaft being mounted for rotation in a pedestal 129.

METHOD OF OPERATION

The method of operation of the unscrambler, for the purpose of unscrambling a bundle of bars, so as to enable the bars to be fed, one at a time, to a transfer or feed mechanism, may be briefly described as follows:

A bundle of bars is deposited by means of any suitable handling equipment onto cradle feed cradle, units, while the units are in their lower position, as in FIG. 3.

The cradles are then elevated to the position indicated approximately by the broken lines A in FIG. 3, causing some of the uppermost bars in the bundle to roll or fall by gravity onto the shuffle bed modules.

This action is repeated, with each elevation of the feed cradles until all of the bars have been transferred onto the shuffle beds.

Figure 4:
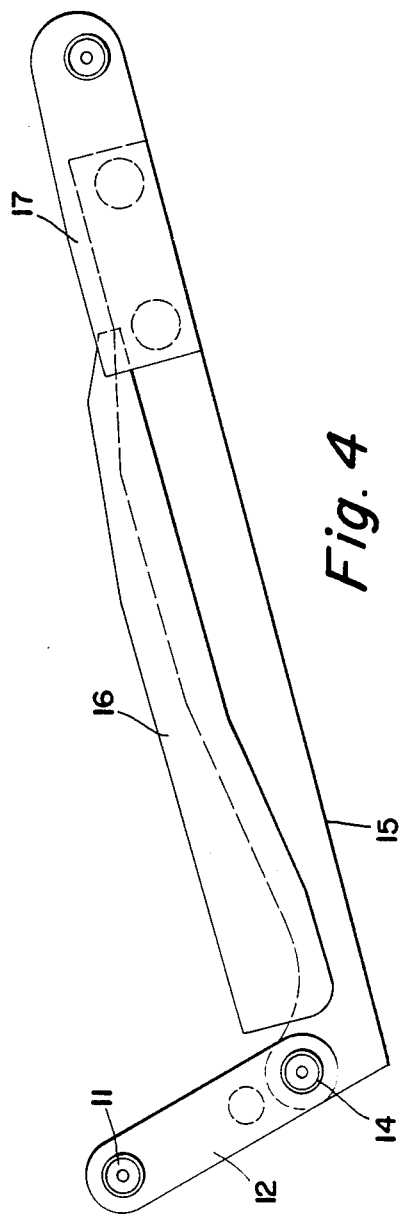
FIG. 4 is a side elevational view of the walking feed cradle of the feed cradle unit, as viewed in the direction indicated by the arrows 4—4 of FIG. 2.

In order to obtain a quicker and more uniform movement of the bars from the bundle, a walking beam action is imparted to the bundle by means of the walking beam cradles shown in FIGS. 4 and 5, and which are activated in unison with the walking beam action of the shuffle bed modules.

As the bars fall or roll from the bundle, they are distributed, as a layer or row of bars, on the shuffle bed modules, and due to the walking beam action of the walking beams of these modules are moved progressively along the stationary or fixed beams of these modules, so that at the exit end of these modules, the bars are delivered singly onto the transfer chains 94 of the bar feeders BF, which chains convey the bars to the bar stops 99.

As each bar arrives at the bar stops 99, it is temporarily restrained by the stops 99 against forward movement.

At this moment, the bar selectors 107 begin their upward movement from a position shown in solid lines in FIG. 13A, which position coincides with the level of the bottoms of the bars B, thus causing the previously restrained bar to be separated from the bars therebehind and to be elevated, so as to cause such previously restrained bar to roll or fall by gravity down the inclined surface 108 of the bar selector 107 and to the bottom of the recesses provided by the surfaces 108 and 109 of the bar selector.

As the bar selectors commence their forward movement to the positions shown progressively in broken lines in FIG. 13A, the selected bar is raised from its initial rest position and is carried forward and over the restraining bar stops.

The selected bar is carried by the bar selector to the successive positions shown in broken lines in FIG. 13A, and the bar is then deposited onto a conveyor or transfer mechanism (not shown) for transfer to any desired delivery point.

Having thus described my invention, I claim:

1. A bar unscrambler comprising a plurality of vertically swingable feed cradles in interconnected laterally-spaced relation to each other, a plurality of laterally-spaced shuffle bed units disposed forwardly of the feed cradles and arranged to receive bars deposited thereon by the feed cradles and to transfer said bars in a direction away from said feed cradles, said feed cradles and said shuffle bed units having movable members contacting said bars to move same incrementally in said direction, said movable members being interconnected, and common drive means for effecting movement of said movable members, and a plurality of laterally spaced bar feeder units, disposed forwardly of the shuffle bed units in the direction of advancement of said bars and arranged to receive bars deposited thereon by the shuffle bed units and to transfer said bars individually in a direction away from said shuffle bed units, said bar feeder units including means for temporarily restraining movement of each of the unscrambler bars and with further means for moving each of said restrained bars individually from said restraining means on said bar feeder units.

2. A bar unscrambler, as defined in claim 1, wherein said shuffle bed units have incorporated therein stationary elements upon which the bars are deposited from said feed cradles, and said movable elements having an orbital movement which coact with said stationary elements to progressively move said bars along said stationary elements toward said bar feeder units.

3. A bar unscrambler comprising a plurality of feed cradles in interconnected laterally spaced relation to each other, a plurality of laterally spaced shuffle bed units disposed forwardly of the feed cradles and arranged to receive bars deposited thereon by the feed cradles and to transfer said bars in a direction away from said feed cradles, said feed cradles being provided with means having a walking beam action, which means are responsive to movement of portions of said shuffle bed units, and a plurality of laterally spaced bar feeder units, disposed forwardly of the shuffle bed units and arranged to receive bars deposited thereon by the shuffle bed units and to transfer said bars in a direction away from said shuffle bed units, said bar feeder units provided with means for temporarily restraining movement of the unscrambled bars and with means for moving said restrained bars individually from said restraining means.

4. A bar unscrambler comprising a plurality of feed cradles in interconnected laterally spaced relation to each other, a plurality of laterally spaced shuffle bed units disposed forwardly of the feed cradles and arranged to receive bars deposited thereon by the feed cradles and to transfer said bars in a direction away from said feed cradles, said shuffle bed units having incorporated therein stationary elements upon which the bars are deposited from said feed cradles, and movable elements having an orbital movement which coact with said stationary elements to progressively move said bars along said stationary elements, said feed cradles being provided with means having a walking beam action, responsive to movement of the movable elements of the shuffle bed units, and a plurality of laterally spaced bar feeder units, disposed forwardly of the shuffle bed units and arranged to receive bars deposited thereon by the shuffle bed units and to transfer said bars in a direction away from said shuffle bed units, said bar feeder units provided with means for temporarily restraining movement of the unscrambled bars and with means for moving said restrained bars individually from said restraining means.

5. A bar unscrambler comprising a plurality of feed cradles in interconnected laterally spaced relation to each other adapted to move bars in a predetermined direction, a plurality of laterally spaced shuffle bed units disposed forwardly of the feed cradles, in the direction of movement of said bars, said cradles including movable members mounted thereon for effecting incremental movement of bars deposited thereon toward said shuffle bed units, each of said shuffle bed units comprising a stationary element upon which the bars are deposited from said feed cradles, and a movable element having an orbital movement which coacts with the stationary element to progressively move said bars along said stationary element, means pivotally connecting said feed cradles to said stationary elements, of said shuffle bed units, further means connecting said feed cradle movable members to said movable element about points lying adjacent the axis of interconnection between said feed cradle and said stationary element of said shuffle bed units, and means for imparting a lifting movement to said feed cradles, said cradles swinging about said pivotal connections to cause bars on said feed cradles to be deposited upon said shuffle bed units without interference with the movement of said feed cradle movable members and said movable element of said feed cradles.

6. A bar unscrambler as defined in claim 5 wherein the said movable members on said feed cradles are walking beam cradles, which are pivotally supported by said feed cradles and are pivotally connected to the movable elements of said shuffle bed units, said walking beam cradles being responsive to movement of said movable elements to impart a walking beam action to said walking beam cradles in relation to said feed cradles.

* * * * *